US009537765B2

(12) United States Patent
Matsubara et al.

(10) Patent No.: US 9,537,765 B2
(45) Date of Patent: Jan. 3, 2017

(54) TRANSPORT CONTROL SERVER, TRANSPORT CONTROL SYSTEM, AND TRANSPORT CONTROL METHOD

(71) Applicant: Hitachi, Ltd., Chiyoda-ku, Tokyo (JP)

(72) Inventors: Daisuke Matsubara, Yokohama (JP); Hitoshi Yabusaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 22 days.

(21) Appl. No.: 14/684,587

(22) Filed: Apr. 13, 2015

(65) Prior Publication Data
US 2016/0142298 A1  May 19, 2016

Related U.S. Application Data

(63) Continuation of application No. 13/501,235, filed as application No. PCT/JP2010/065197 on Sep. 6, 2010, now abandoned.

(30) Foreign Application Priority Data

Dec. 10, 2009  (JP) .................................. 2009-280065

(51) Int. Cl.
*H04L 12/753* (2013.01)
*H04L 12/751* (2013.01)
(Continued)

(52) U.S. Cl.
CPC .............. *H04L 45/48* (2013.01); *H04L 45/10* (2013.01); *H04L 45/123* (2013.01); *H04L 45/22* (2013.01); *H04L 45/50* (2013.01)

(58) Field of Classification Search
None
See application file for complete search history.

(56) References Cited

U.S. PATENT DOCUMENTS

| 6,519,231 B1 | 2/2003 | Ding et al. |
| 2004/0042473 A1 | 3/2004 | Park et al. |

(Continued)

FOREIGN PATENT DOCUMENTS

| JP | 2003-318955 | 7/2003 |
| JP | 2005-101833 A | 4/2005 |

(Continued)

OTHER PUBLICATIONS

International Search Report cited in related International Patent Application No. PCT/JP2010/065197, completed Oct. 8, 2010.

*Primary Examiner* — Chirag Shah
*Assistant Examiner* — Rina Pancholi
(74) *Attorney, Agent, or Firm* — Foley & Lardner LLP

(57) ABSTRACT

A passage channel is calculated by taking into account a plurality of requirements having different importance degrees. A channel calculation unit (202) of a transport control server (100) calculates a plurality of passage channel candidates with respect to a passage setting request wherein an active passage candidate and a standby passage candidate are paired in the passage channel candidate; and calculates the occurrence number of phenomena that violate a predetermined requirement relating an operation of the active passage and the standby passage, or a value of a network element for determining whether the requirement is violated, with respect to each passage channel candidate. A cost calculation unit (205) calculates the cost of a passage channel from the calculated number of occurrence, network element value, and a predetermined cost calculation coefficient corresponding to the requirement. A GUI control unit (display control unit) 201 displays identification information of the passage channel candidate, the number of occurrences or the network element value, and the cost, as a list on, for example, a management terminal.

5 Claims, 19 Drawing Sheets

(51) Int. Cl.
*H04L 12/707* (2013.01)
*H04L 12/721* (2013.01)
*H04L 12/723* (2013.01)

(56) References Cited

U.S. PATENT DOCUMENTS

| | | | |
|---|---|---|---|
| 2004/0151130 | A1 | 8/2004 | Beshai et al. |
| 2007/0280117 | A1* | 12/2007 | Katz ................. H04L 12/24 370/238 |
| 2008/0075008 | A1 | 3/2008 | Kano |
| 2009/0285101 | A1* | 11/2009 | Lu ..................... H04L 41/12 370/238 |
| 2009/0285208 | A1* | 11/2009 | Lu ..................... H04L 45/12 370/389 |
| 2010/0061264 | A1* | 3/2010 | Campbell ........ H04L 43/0852 370/253 |

FOREIGN PATENT DOCUMENTS

| | | |
|---|---|---|
| JP | 2006-135686 | 5/2006 |
| JP | 2007-074312 | 3/2007 |
| JP | 2007-158818 | 6/2007 |
| JP | 2007-166433 | 6/2007 |
| JP | 2007-194719 A | 8/2007 |
| JP | 2008-054211 | 3/2008 |
| JP | 2008-085642 | 4/2008 |

\* cited by examiner

| NODE IDENTIFIERS | 131 | 132 | 133 | 134 | 135 | 136 | 137 |
|---|---|---|---|---|---|---|---|
| NODE TYPES | A | B | C | B | B | A | B |

FIG. 3A

| LINK IDENTIFIERS | 1 | 2 | 3 | 4 | 5 | 6 | 7 | 8 |
|---|---|---|---|---|---|---|---|---|
| PACKAGES | 141-143 | 143-144 | 145-146 | 142-146 | 144-146 | 146-147 | 148-149 | 145-149 |

FIG. 3B

| PACKAGE IDENTIFIERS | 141 | 142 | 143 | 144 | 145 | 146 | 147 |
|---|---|---|---|---|---|---|---|
| NODES | 131 | 131 | 132 | 133 | 133 | 134 | 135 |

FIG. 4A

| INTER-PACKAGE IDENTIFIERS | 1 | 2 | 3 |
|---|---|---|---|
| PACKAGES | 141-142 | 144-145 | 147-148 |

FIG. 4B

| REQUIREMENTS | ① | ② | ③ | ④ | ⑤ | ⑥ | COSTS |
|---|---|---|---|---|---|---|---|
| PATH CHANNEL CANDIDATE 1 | 0 | 3 | 0 | 5 | 0 | 0.3 | 43 |
| PATH CHANNEL CANDIDATE 2 | 0 | 3 | 1 | 3 | 0 | 0.1 | 39 |
| PATH CHANNEL CANDIDATE 3 | 0 | 3 | 2 | 1 | 0 | 0.1 | 43 |
| PATH CHANNEL CANDIDATE 4 | 0 | 3 | 1 | 4 | 0 | 0.8 | 51 |
| PATH CHANNEL CANDIDATE 5 | 0 | 3 | 2 | 3 | 0 | 0.5 | 51 |
| PATH CHANNEL CANDIDATE 6 | 0 | 3 | 2 | 3 | 0 | 1.2 | 58 |
| PATH CHANNEL CANDIDATE 7 | 0 | 4 | 1 | 3 | 0 | 0.2 | 53 |
| PATH CHANNEL CANDIDATE 8 | 0 | 4 | 2 | 3 | 0 | 2.3 | 79 |
| -- | -- | -- | -- | -- | -- | -- | -- |

FIG.5

| COST CALCULATION COEFFICIENT | ×10² ① | ×10 ② | ×5 ③ | ×1 ④ | ×10 ⑤ | ×10 ⑥ | COSTS |
|---|---|---|---|---|---|---|---|
| REQUIREMENT | | | | | | | 900 |
| PATH CHANNEL 2 | 0 | 3 | 1 | 3 | 0 | 0.1 | 39 |
| PATH CHANNEL 1 | 0 | 3 | 0 | 5 | 0 | 0.3 | 43 |
| PATH CHANNEL 3 | 0 | 3 | 1 | 4 | 0 | 0.1 | 43 |
| PATH CHANNEL 4 | 0 | 3 | 2 | 1 | 0 | 0.8 | 51 |
| PATH CHANNEL 5 | 0 | 3 | 2 | 3 | 0 | 0.5 | 51 |
| PATH CHANNEL 7 | 0 | 4 | 1 | 3 | 0 | 0.2 | 53 |
| PATH CHANNEL 6 | 0 | 3 | 2 | 3 | 0 | 1.2 | 58 |
| PATH CHANNEL 8 | 0 | 4 | 2 | 3 | 0 | 2.3 | 79 |
| | -- | -- | -- | -- | -- | -- | -- |

FIG.9

| | 131-132 | 132-133 | 133-134 | 131-134 | 133-135 | 135-136 | 136-137 | 133-137 |
|---|---|---|---|---|---|---|---|---|
| REDUNDANT BANDWIDTHS | 100 | 530 | 710 | 300 | 140 | 330 | 260 | 670 |

|  | ACTIVE | BACKUP |
|---|---|---|
| PATH CHANNEL 1 | LINK(1) – NODE(131){PACKAGE(141)} – LINK(2) – NODE(132){PACKAGE(143)} – LINK(3) – NODE(133){PACKAGE(144)} – LINK(4) – NODE(135){PACKAGE(147)} – LINK(5) – NODE(136){PACKAGE(148)} – LINK(6) | LINK(11) – NODE(131){PACKAGE(142)} – LINK(12) – NODE(134){PACKAGE(146)} – LINK(13) – NODE(133){PACKAGE(145)} – LINK(14) – NODE(137){PACKAGE(150)} – LINK(15) – NODE(136){PACKAGE(149)} – LINK(16) |
| PATH CHANNEL 2 | LINK(1) – NODE(131){PACKAGE(141)} – LINK(2) – NODE(132){PACKAGE(143)} – LINK(3) – NODE(133){PACKAGE(144)} – PACKAGE(145)} – LINK(14) – NODE(135){PACKAGE(150)} – LINK(15) – NODE(136){PACKAGE(149)} – LINK(16) | LINK(11) – NODE(131){PACKAGE(142)} – LINK(12) – NODE(134){PACKAGE(146)} – LINK(13) – NODE(133){PACKAGE(145)} – PACKAGE(144)} – LINK(4) – NODE(135){PACKAGE(147)} – LINK(15) – NODE(136){PACKAGE(136)} – LINK(16) |
|  |  |  |

FIG.12

| COST CALCULATION COEFFICIENT | ×10² ① | ×10 ② | ×5 ③ | ×1 ④ | ×10 ⑤ | COSTS |
|---|---|---|---|---|---|---|
| REQUIREMENT | 0 | 3 | 1 | ⑤ | 0 | 40 |
| PATH CHANNEL 1 | 0 | 3 | ② | 1 | 0 | 41 |
| PATH CHANNEL 2 | 0 | 4 | 1 | 4 | 0 | 49 |
| PATH CHANNEL 52 | 0 | 4 | 2 | 1 | 0 | 51 |
| PATH CHANNEL 119 | 0 | 4 | 2 | 3 | 0 | 53 |
| PATH CHANNEL 15 | 0 | 4 | 2 | 3 | 0 | 53 |
| PATH CHANNEL 679 | 0 | 5 | 1 | 3 | 0 | 58 |
| PATH CHANNEL 12 | 0 | 5 | 2 | 3 | 0 | 63 |
| PATH CHANNEL 800 | -- | -- | -- | -- | -- | |

FIG.13

| COST CALCULATION COEFFICIENT | ①  ×10² | ②  ×10 | ③  ×5 | ④  ×2 | ⑤  ×10 | COSTS |
|---|---|---|---|---|---|---|
| REQUIREMENT | 0 | 3 | 2 | 1 | 0 | 42 |
| PATH CHANNEL 2 | 0 | 3 | 1 | 5 | 0 | 50 |
| PATH CHANNEL 1 | 0 | 4 | 2 | 1 | 0 | 52 |
| PATH CHANNEL 119 | 0 | 4 | 1 | 4 | 0 | 53 |
| PATH CHANNEL 52 | 0 | 4 | 2 | 3 | 0 | 56 |
| PATH CHANNEL 15 | 0 | 4 | 2 | 3 | 0 | 56 |
| PATH CHANNEL 679 | 0 | 5 | 1 | 3 | 0 | 61 |
| PATH CHANNEL 12 | 0 | 5 | 2 | 3 | 0 | 66 |
| PATH CHANNEL 800 | -- | -- | -- | -- | -- | |

FIG.14

| LINK IDENTIFIERS | 1 | 2 | 3 | 4 | 5 | 6 | 7 | 8 |
|---|---|---|---|---|---|---|---|---|
| ACTIVE PATH FLAGS | 1 | 1 | 0 | 0 | 1 | 1 | 0 | 0 |
| BACKUP PATH FLAGS | 0 | 0 | 1 | 1 | 0 | 0 | 1 | 1 |

FIG. 15A

| NODE IDENTIFIERS | 131 | 132 | 133 | 134 | 135 | 136 | 137 |
|---|---|---|---|---|---|---|---|
| ACTIVE PATH FLAGS | 1 | 1 | 1 | 0 | 1 | 1 | 0 |
| BACKUP PATH FLAGS | 0 | 0 | 1 | 1 | 0 | 1 | 1 |

FIG. 15B

| PACKAGE IDENTIFIERS | 141 | 142 | 143 | 144 | 145 | 146 | 147 |
|---|---|---|---|---|---|---|---|
| ACTIVE PATH FLAGS | 1 | 0 | 1 | 1 | 0 | 1 | 1 |
| BACKUP PATH FLAGS | 0 | 1 | 0 | 0 | 1 | 0 | 0 |

FIG. 16A

| INTER-PACKAGE IDENTIFIERS | 1 | 2 | 3 |
|---|---|---|---|
| ACTIVE PATH FLAGS | 0 | 0 | 0 |
| BACKUP PATH FLAGS | 0 | 0 | 0 |

FIG. 16B

| LINK IDENTIFIERS | 1 | 2 | 3 | 4 | 5 | 6 | 7 | 8 |
|---|---|---|---|---|---|---|---|---|
| REDUNDANT BANDWIDTHS | 100 | 530 | 710 | 300 | 140 | 330 | 260 | 670 |

FIG.17

| | 131-132 | 132-133 | 133-134 | 131-134 | 133-135 | 135-136 | 136-137 | 133-137 |
|---|---|---|---|---|---|---|---|---|
| REDUNDANT BANDWIDTHS | 100 | 530 | 710 | 300 | 140 | 330 | 260 | 670 |

TRANSPORT CONTROL SERVER, TRANSPORT CONTROL SYSTEM, AND TRANSPORT CONTROL METHOD

CROSS-REFERENCE TO RELATED PATENT APPLICATIONS

Japan Priority Application 2009-280065, filed Dec. 10, 2009 including the specification, drawings, claims and abstract, is incorporated herein by reference in its entirety. This application is a Continuation of U.S. application Ser. No. 13/501,235 (National Stage of PCT/JP2010/065197), filed Jun. 22, 2012, incorporated herein by reference in its entirety.

TECHNICAL FIELD

The present invention relates to a transport control server (TCS), a transport control system, and a transport control method, and more particularly to a transport control server, a transport control system, and a transport control method in which the number of occurrences of a phenomenon that violates a requirement designated by a network operator is counted with respect to a combination of an active path and a backup path, and path channel candidates are ordered and displayed, to thereby facilitate a selection of an optimum path channel by the operator.

BACKGROUND ART

In a conventional transport control system, various techniques for automatically designing a path channel have been used in setting and controlling a path such as multi-protocol label switching (MPLS). For example, JP-A-2008-85642 (Patent Literature 1) provides a technique by which when a network is divided into plural areas, a path crossing the areas is efficiently set. Also, JP-A-2008-54211 (Patent Literature 2) enables an LSP channel calculation which minimizes the number of links configuring a label switch path (LSP). Also, JP-A-2007-166433 (Patent Literature 3) sets a channel by easing conditions even in any network environments, and even under circumstances where an alternative channel is not found. Also, JP-A-2007-158818 (Patent Literature 4) provides a technique by which the number of paths caused by a channel change is reduced during recalculation while achieving an effective use of network resources. Also, JP-A-2007-74312 (Patent Literature 5) enables a bypass for P2MP TE LSP due to P2MP TE LSP to be set.

RELATED ART LITERATURES

Patent Literatures

[Patent Literature 1] JP-A-2008-85642
[Patent Literature 2] JP-A-2008-54211
[Patent Literature 3] JP-A-2007-166433
[Patent Literature 4] JP-A-2007-158818
[Patent Literature 5] JP-A-2007-74312

DISCLOSURE OF THE INVENTION

Problems to be Solved by the Invention

In the conventional system, only a single requirement is considered in calculating a path channel, and plural requirements are not dealt with. Also, respective conventional systems meet different requirements. However, because a technique for calculating the path channel is different depending on the respective conventional systems, a uniform technique corresponding to all the requirements is not provided. Further, those conventional systems provide no means for allowing a network operator to select a final path channel from plural path channel candidates while evaluating adaptability to the plural requirements.

On the other hand, there are various requirements designated by the network operator, and there is no conventional system that calculates an optimum path channel taking all of those requirements into account. In the conventional system, there are methods for calculating the path channel on the basis of the single requirement, but there is no calculating method taking the plural requirements into account. Also, there is provided no means for allowing the network operator to visually compare the plural path channel candidates with each other to confirm that a path channel candidate calculated as a result of taking the plural requirements into account is optimum without a doubt.

In view of the above, one object of the present invention is to calculate a path channel taking plural requirements different in the degree of importance into account. Another object of the present invention is to allow a network operator to select a final path channel from plural path channel candidates while evaluating the adaptability to plural requirements.

Means for Solving the Problems

According to the present invention, there are provided a transport control server, a network system, and a transport control method in which the number of occurrences of a phenomenon that violates a requirement designated by a network operator is counted with respect to a combination of an active path and a backup path, and path channel candidates are ordered and displayed, to thereby facilitate a selection of an optimum path by the operator.

According to the first solving means of the present invention, there is provided a transport control server in a network system having a plurality of nodes and the transport control server, the transport control server comprising:

a channel calculation unit that calculates a plurality of candidates of path channels in each of which a candidate of an active path and a candidate of a backup path are paired with respect to a request for path setting, and calculates the number of occurrences of phenomena that violate one or a plurality of predetermined requirements for operation of the active path and the backup path, or a value of a network element for determining whether to violate the requirements or not, for each of the candidates of the path channels;

a cost calculation unit that calculates a cost of the path channel according to the calculated number of occurrences or the calculated value of the network element, and predetermined cost calculation coefficients corresponding to the requirements; and a display controller that displays identification information on the candidates of the path channels, the number of occurrences or the value of the network element, and the costs, as a list.

According to the second solving means of the present invention, there is provided a transport control system, comprising:

a transport control server that manages a plurality of nodes; and a management terminal that displays information from the transport control server, wherein the transport control server comprising:

a channel calculation unit that calculates a plurality of candidates of path channels in each of which a candidate of an active path and a candidate of a backup path are paired with respect to a request for path setting, and calculates the number of occurrences of phenomena that violate one or a plurality of predetermined requirements for operation of the active path and the backup path, or a value of a network element for determining whether to violate the requirements or not, for each of the candidates of the path channels;

a cost calculation unit that calculates a cost of the path channel according to the calculated number of occurrences or the calculated value of the network element, and predetermined cost calculation coefficients corresponding to the requirements; and a display controller that displays identification information on the candidates of the path channels, the number of occurrences or the value of the network element, and the costs, to the management terminal as a list.

According to the third solving means of the invention, there is provided a transport control method in a network system having a plurality of nodes and the transport control server, the transport control method including steps of:

calculating a plurality of candidates of path channels in each of which a candidate of an active path and a candidate of a backup path are paired with respect to a request for path setting, and calculating the number of occurrences of phenomena that violate one or a plurality of predetermined requirements for operation of the active path and the backup path, or a value of a network element for determining whether to violate the requirements or not, for each of the candidates of the path channels;

calculating a cost of the path channel according to the calculated number of occurrences or the calculated value of the network element, and predetermined cost calculation coefficients corresponding to the requirements; and displaying identification information on the candidates of the path channels, the number of occurrences or the value of the network element, and the costs, as a list.

Effects of the Invention

It is possible, by the present invention, to calculate a path channel taking plural requirements different in the degree of importance into account. Also, it is possible, by the present invention, to allow a network operator to select a final path channel from plural path channel candidates while evaluating the adaptability to plural requirements.

BRIEF DESCRIPTION OF THE DRAWINGS

FIG. 3A is an illustrative view illustrating a node management table.

FIG. 3B is an illustrative view illustrating a link management table.

FIG. 4A is an illustrative view illustrating a package management table.

FIG. 4B is an illustrative view illustrating an inter-package management able.

FIG. 5 is an illustrative view illustrating a path channel candidate table.

FIG. 9 is an illustrative view illustrating a path channel candidate list.

FIG. 12 is an illustrative view illustrating a path channel table.

FIG. 13 is an illustrative view illustrating a path channel candidate table for recalculation (1).

FIG. 14 is an illustrative view illustrating the path channel candidate table for recalculation (2).

FIG. 15A is an illustrative view illustrating a channel link table.

FIG. 15B is an illustrative view illustrating a channel node table.

FIG. 16A is an illustrative view illustrating a channel package table.

FIG. 16B is an illustrative view illustrating an inter-channel package table.

FIG. 17 is an illustrative view illustrating a link redundant bandwidth table.

BEST MODE FOR CARRYING OUT THE INVENTION

Figure 1:
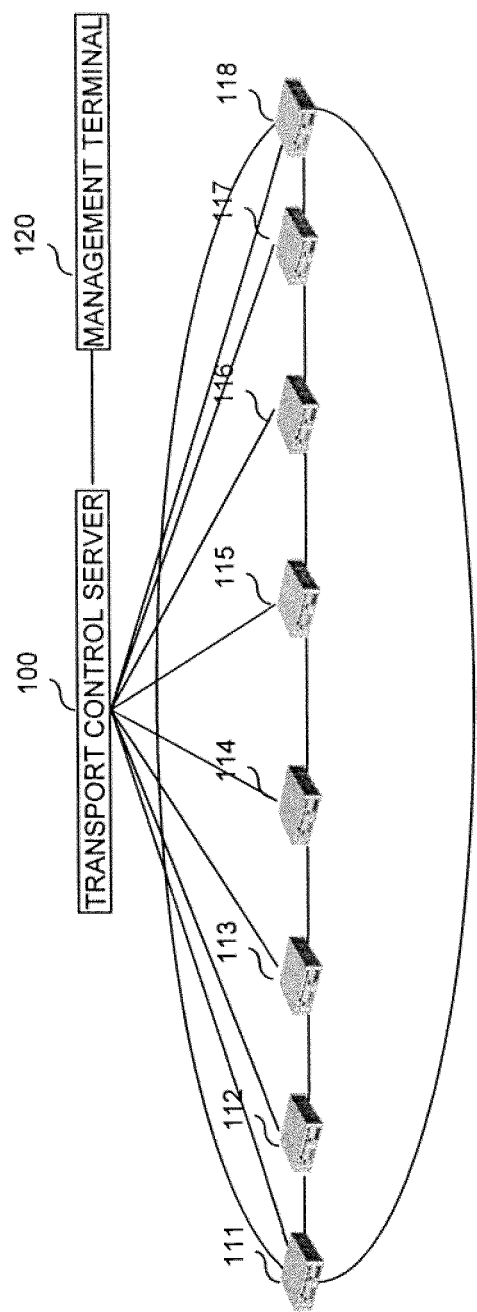
FIG. 1 is a configuration diagram illustrating a transport control system.

Hereinafter, a network system according to embodiments of the present invention will be described in detail with reference to the drawings. In the following description, identical reference numerals denote the same or similar parts.

FIG. 1 is a configuration diagram illustrating a network system according to this embodiment.

The network system includes a transport control server 100 that controls a network, a management terminal 120 that is coupled to the transport control server 100 and provides a screen display and a system operating means, and nodes 111 to 118 that is managed by the transport control server 100.

The transport control server 100 is coupled to the nodes 111 to 118, and sets paths coupled between the respective nodes. As examples of path techniques, there can be used a Multi-Protocol Label Switching (MPLS), an MPLS Transport Profile (MPLS-TP), a Provider Backbone Bridge Traffic Engineering (PBB-TE), and so on. The paths are set for VPNs accommodated in the respective nodes, and services of sounds or moving pictures, and therefore set between the respective nodes.

As the number of services and the number of nodes are increased, the number of paths is also increased. Therefore, the costs required for designing and managing path channels become enormous. As an example, the number of path channels settable among 1000 nodes is about half a million even if a directionality of each path is not taken into account when it is assumed that each link between the respective nodes is one in number. The number of links between the respective nodes is normally two or more, and therefore the number of paths is increased. Further, when the number of channels between two nodes is plural, the number of path channels is further increased. Also, as the number of services is increased, the number of paths set on the network is also increased. Hence, for the purpose of selecting an optimum path channel from an enormous number of path channels while the paths already set on the network are taken into account, it is essential to automatize a path channel calculation.

Now, requirements designated by the network operator will be described. The requirements include, for example, (1) a link disjoint (link disjoint), (2) a node disjoint (node disjoint), (3) a package disjoint (package disjoint), (4) hop number minimization, (5) the minimization of a package straddle, (6) the equalization of redundant bandwidths, and so on. The requirement (1) of the link disjoint is to select a channel in which a coupling link between the same nodes is not shared by an active path and a backup path. Also, the requirement (2) of the node disjoint is to select a channel in which the same node is not shared by the active path and the backup path. The requirement (3) of the package disjoint is to select a channel in which the same package (corresponding to a network interface card) in the node is not shared by the active path and the backup path. The requirement (4) of the hop number minimization is to reduce the number of hops of the active path and the backup path as much as possible. The requirement (5) of the minimization of a package straddle is to reduce the number of times of straddling different packages within the node where the active path and the backup path are identical with each other as much as possible. The requirement (6) of the equalization of redundant bandwidths is to equalize the redundant bandwidths of the respective links as much as possible so that no bias occurs in the redundant bandwidths. The other appropriate requirements can be used.

Some of those requirements will be described with reference to FIG. 8. In an example of FIG. 8, nodes 131 to 137 are coupled to each other by links. The node 131 is equipped with packages 141 and 142, the node 132 is equipped with a package 143, the node 133 is equipped with packages 144 and 145, the node 134 is equipped with a package 146, the node 135 is equipped with a package 147, the node 136 is equipped with packages 148 and 149, and the node 137 is equipped with a package 150.

An active path 151 is represented by a solid line, and passes through the package 141 of the node 131, the package 143 of the node 132, the package 144 of the node 133, the package 147 of the node 135, and the package 148 of the node 136. On the other hand, a backup path 152 is represented by a broken line, and passes through the package 142 of the node 131, the package 146 of the node 134, the package 145 of the node 133, the package 150 of the node 137, and the package 149 of the node 136.

Figure 8:
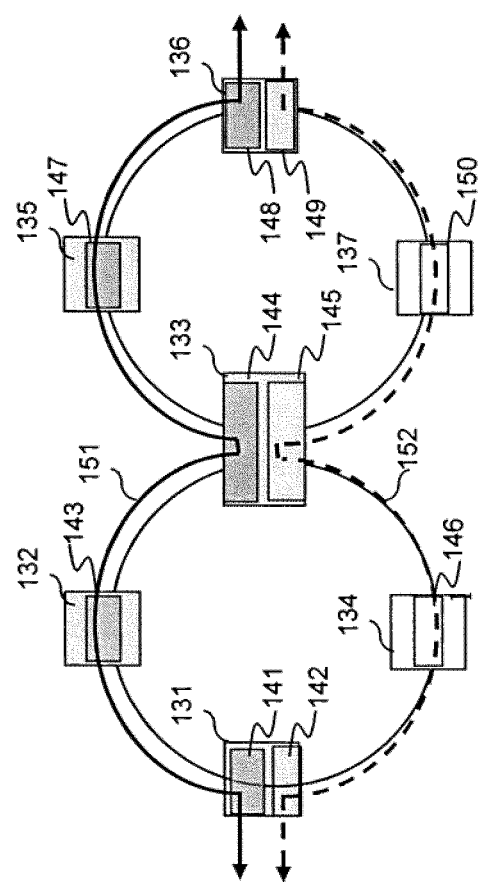
FIG. 8 is an illustrative view illustrating a network of path channel candidates (No. 1).

The requirement (1) of the link disjoint means that the active path and the backup path do not pass through the link between the same nodes, and is satisfied by the configuration of FIG. 8. The requirement (2) of the node disjoint means that the active path and the backup path do not pass through the same node, and as a phenomenon that violates this requirement, FIG. 8 illustrates the node 131, the node 133, and the node 136. The requirement (3) of the package disjoint means that the active path and the backup path do not pass through the same package, and is satisfied by the configuration of FIG. 8. The requirement (4) of the hop number minimization means that the number of nodes through which the active path and the backup path pass is minimized, and in FIG. 8, the number of hops in the active path is 5, and the number of hops in the backup path is 5.

Figure 18:
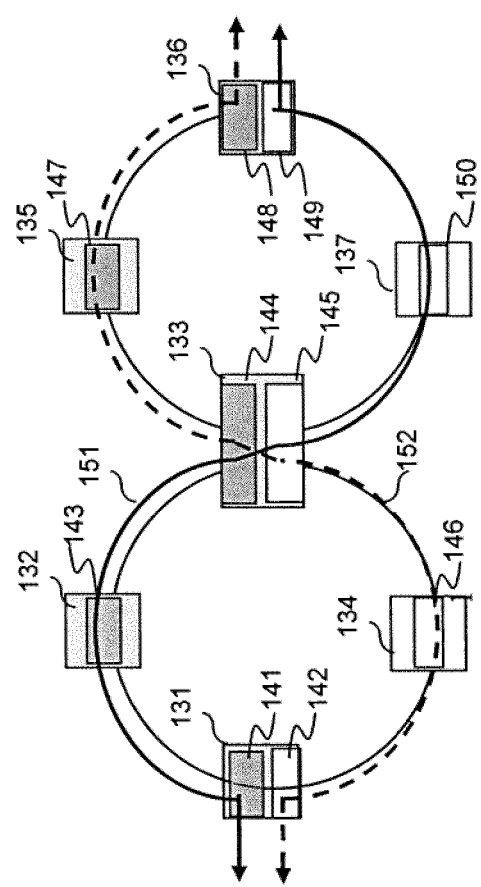
FIG. 18 is an illustrative view illustrating the network of the path channel candidates (No. 2).

Another requirement will be described with reference to FIG. 18. The nodes 131 to 137 and the packages 141 to 150 are identical with those in FIG. 8. The active path 151 is represented by a solid line, and passes through the package 141 of the node 131, the package 143 of the node 132, the package 144 of the node 133, the package 145 of the node 133, the package 150 of the node 137, and the package 149 of the node 136. On the other hand, the backup path 152 is represented by a broken line, and passes through the package 142 of the node 131, the package 146 of the node 134, the package 145 of the node 133, the package 144 of the node 133, the package 147 of the node 135, and the package 148 of the node 136.

The requirement (5) of the minimization of the package straddle means that the number of times by which the active path or the backup path straddles the different packages within the same node is minimized. As a phenomenon that violates this requirement, FIG. 18 illustrates a portion in which the active path straddles from the package 144 to the package 145 within the node 133, and a portion in which the backup path straddles from the package 145 to the package 144 within the node 133.

Figures 19A, 19B:
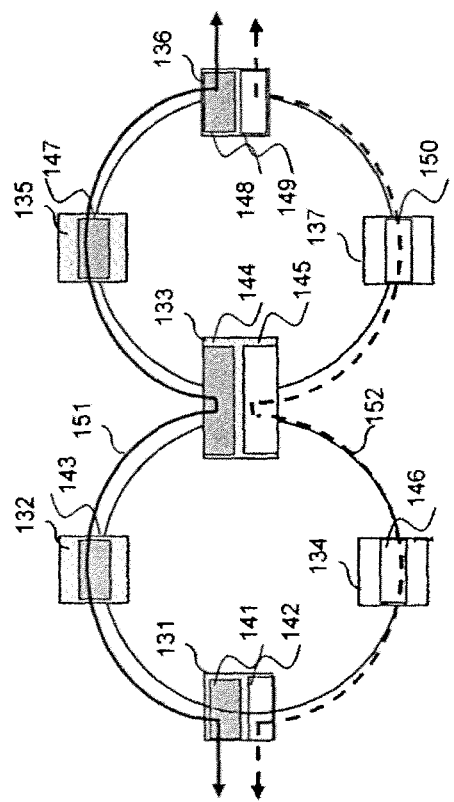
FIG. 19A is an illustrative view illustrating the network of the path channel candidates (No. 3).
FIG. 19B illustrates the redundant bandwidths for the nodes of the network of FIG. 19A.

Still another requirement will be described with reference to FIGS. 19A and 19B. The nodes 131 to 137 and the packages 141 to 150 are identical with those in FIG. 8. The requirement (6) of the equalization of redundant bandwidths means that the redundant bandwidths of the respective links are equalized as much as possible so that no bias occurs in the redundant bandwidths. The redundant bandwidths in the link between the nodes 131 to 132, 132 to 133, 133 to 134, 131 to 134, 133 to 135, 135 to 136, 136 to 137, and 133 to 137 are shown in a table as numerical values regarding the requirement. In this example, the redundant bandwidth is obtained by, for example, subtracting a sum of required bandwidths from a bandwidth of the link.

Figure 2:
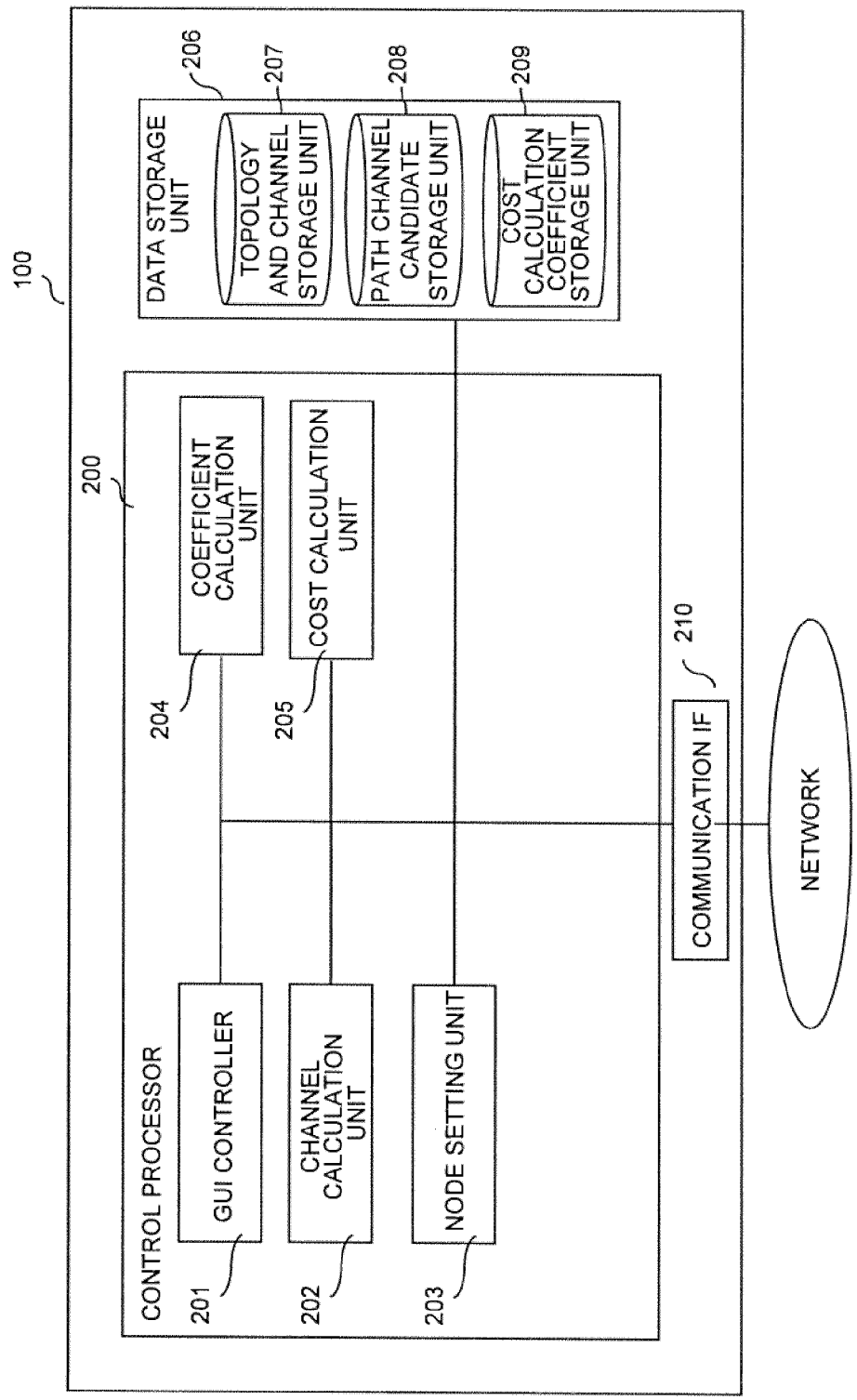
FIG. 2 is a configuration diagram illustrating a transport control server.

FIG. 2 illustrates a configuration of the transport control server 100 according to this embodiment.

The transport control server 100 includes, for example, a control processor 200, a communication IF 210, and a data storage unit 206. The control processor 200 includes a graphical user interface (GUI) controller (display controller) 201, a channel calculation unit 202, anode setting unit 203, a coefficient calculation unit 204, and a cost calculation unit 205. The data storage unit 206 includes a topology and channel storage unit 207, a path channel candidate storage unit 208, and a cost calculation coefficient storage unit 209.

The topology and channel storage unit 207 stores a node management table 700, a link management table 710, a package management table 720, an inter-package management table 730, a channel link table 600, a channel node table 610, a channel package table 620, an inter-channel-package table 630, and a link redundant bandwidth table 640, which will be described later, therein. Also, the path channel candidate storage unit 208 stores a path channel candidate table 400 therein. The cost calculation coefficient storage unit 209 stores a cost calculation coefficient table 500 therein. The node management table 700, the link management table 710, the package management table 720, the inter-package management table 730, the channel link table 600, the channel node table 610, the channel package table 620, the inter-channel-package table 630, the link redundant bandwidth table 640, the path channel candidate table 400, and the cost calculation coefficient table 500 may not be always divided into the respective storage units 207 to 209. The respective tables will be described later. The respective table configurations may be replaced with appropriate storage areas.

The GUI controller 201 communicates with the management terminal 120 through the communication IF 210, and controls input and output of data. The channel calculation unit 202 searches the channels between the respective nodes. The node setting unit 203 notifies the respective nodes of setting of the selected path through the communication IF 210. The coefficient calculation unit 204 recalculates a cost calculation coefficient. The cost calculation unit 205 calculates the costs of a path channel candidate. The communication IF 210 is an interface for communicating with external devices such as the management terminal 120 and the respective nodes.

FIG. 3A illustrates the node management table 700. In the node management table 700, identifiers 701 of the nodes are associated with types 702 of the nodes. The types 702 of the nodes indicate, for example, models or versions of the nodes. FIG. 3B illustrates the link management table 710. In the link management table 710, identifiers 711 of the links are associated with identifiers 712 of the packages coupled with the links. In the identifiers 712 of the packages are stored, for example, two package identifiers at both ends of each link.

FIG. 4A illustrates the package management table 720. In the package management table 720, package identifiers 721 are associated with identifiers 722 of the nodes each having the package mounted therein. FIG. 4B illustrates the inter-package management table 730. In the inter-package management table 730, inter-package identifiers 731 are associated with related package identifiers 732. Information in the respective tables of the node management table 700, the link management table 710, the package management table 720, and the inter-package management table 730 can be stored in advance. For example, information may be collected from the respective nodes.

FIG. 15A illustrates the channel link table 600. The channel link table 600 stores correspondences of link identifiers 601, flags 602 each indicating that the selected active path passes through a corresponding link, and flags 603 each indicating that the selected backup path passes through a corresponding link therein. FIG. 15B illustrates the channel node table 610. The channel node table 610 stores correspondences of node identifiers 611, flags 612 each indicating that the active path passes through a corresponding node, and flags 613 each indicating the backup path passes through a corresponding node therein. FIG. 16A illustrates the channel package table 620. The channel package table 620 stores correspondences of package identifiers 621, flags 622 each indicating that the active path passes through a corresponding package, and flags 623 each indicating that the backup path passes through a corresponding package therein. FIG. 16B illustrates the inter-channel-package table 630. The inter-channel-package table 630 stores correspondences of inter-package identifiers 631, flags 632 each indicating that the active path straddles between corresponding packages, and flags 633 each indicating that the backup path straddles between respective packages therein. In the respective flags of the active path and the backup path in the channel link table 600, the channel node table 610, the channel package table 620, and the inter-channel-package table 630, every time the active path or the backup path is selected, the previous information is cleared, and information on the selected active path or backup path can be stored.

FIG. 17 illustrates the link redundant bandwidth table 640. In the link redundant bandwidth table 640, link identifiers 641 are associated with redundant bandwidths 641 of the links. Inverse numbers of the redundant bandwidths of the links may be stored.

FIG. 12 illustrates a path channel table 800. In the path channel table 800, channel information (information on links, nodes, and packages through which channels pass through) on the active path and the backup path are associated with each other as the path channel candidates.

FIG. 5 illustrates the path channel candidate table 400. In the path channel candidate table 400, types of the requirements 401 are associated with the numbers of occurrences 402 to 409 by which the phenomena that violate the requirements occur in the respective path channel candidates, and the costs obtained on the basis of the numbers of occurrences.

In the minimizing requirements such as the requirements (4) and (5), values of network elements for determining the violation of the requirements may be stored. For example, in the hop number minimization requirement in the requirement (4), the number of hops may be stored as the value of the network element. For example, the respective numbers of hops in the active path and the backup path, or a sum of the numbers of hops in the active path and the backup path can be stored. Also, in the minimization requirement of the package straddle in the requirement (5), the number of time by which the active path and the backup path straddle the different packages within the same node may be stored as the network element.

Figure 6:
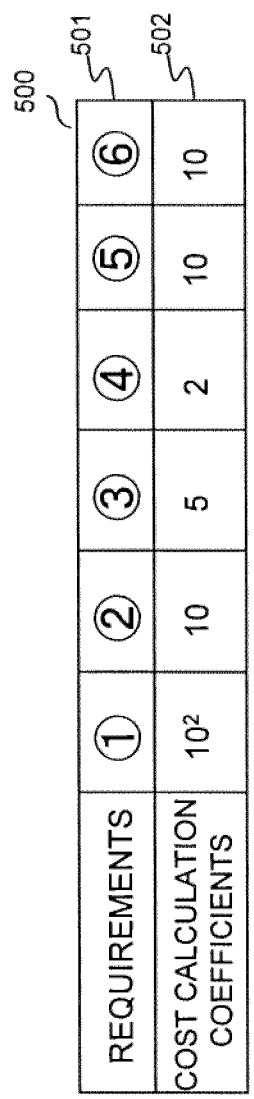
FIG. 6 is an illustrative view illustrating a cost calculation coefficient table.

FIG. 6 illustrates the cost calculation coefficient table 500. In the cost calculation coefficient table 500, types of the requirements 501 and cost calculation coefficients 502 for calculating the costs of the paths are associated with each other.

Figure 7:
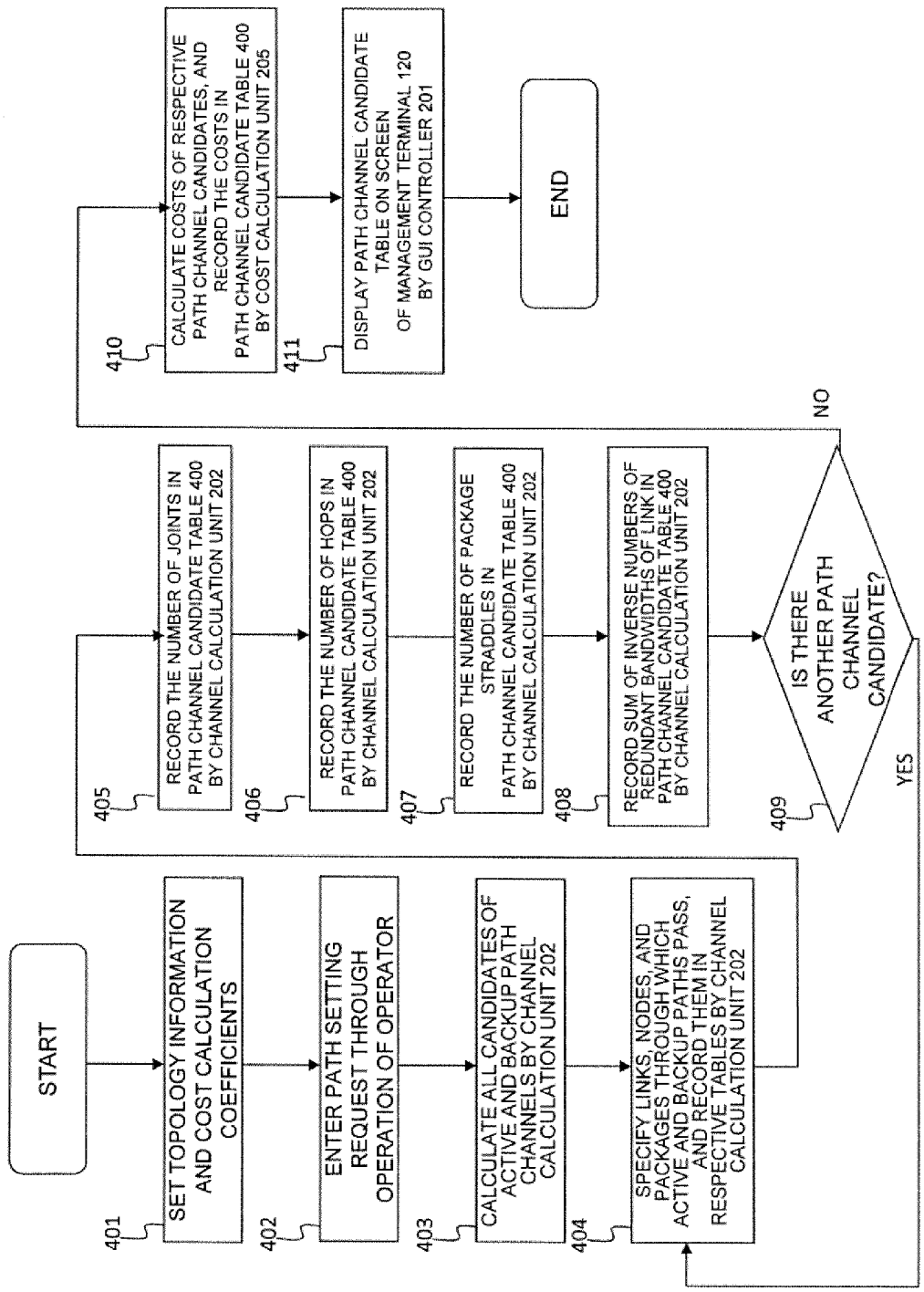
FIG. 7 is a flowchart illustrating the transport control server.

FIG. 7 illustrates a flowchart of this embodiment.

In Step 401, the transport control server 100 sets topology information and the cost calculation coefficients. The topology information means information related to a topology of the network, which is stored in, for example, the node management table 700, the link management table 710, and the package management table 720. The node setting unit 203 of the transport control server 100 acquires, from the nodes 111 to 118 through the communication IF 210, the node identifiers, the node types, the link identifiers, and the package identifiers related to those nodes, and records those information in the node management table 700, the link management table 710, and the package management table 720. Also, the control processor 200 (for example, the node setting unit 203) allocates an inter-package identifier to a combination of two packages within the same node, and stores the inter-package identifier and the identifier of the combined two packages in the inter-package management table 730 on the basis of the information in the package management table 720. Also, for the cost calculation coefficients, for example, the coefficient calculation unit 204 sets a system specified value in the cost calculation coefficient table 500, or the GUI controller 201 sets the cost calculation coefficient set by using the GUI of the management terminal 120 by an operator in the cost calculation coefficient table 500.

In Step 402, the transport control server 100 enters a parameter of a path setting request set by using the GUI of the management terminal 120 by the operator. As the parameter of the path setting request, there are, for example, an identifier of an entry side node, an identifier of an exit side node, and a bandwidth of the path. The GUI controller 201 receives the parameter of the path setting request input by the operator from the management terminal 120 through the communication IF 210, and delivers the received parameter to the channel calculation unit 202.

In Step 403, the channel calculation unit 202 acquires the topology information of the network from the node management table 700, the link management table 710, and the package management table 720, and calculates all the combinations of the active paths and the backup paths as the path channel candidates by searching all the channels. A known appropriate technique can be used for the channel search. The combinations of the active paths and the backup paths can be obtained by, for example, obtaining candidates of the channels between the entry side node and the exit side node, and selecting two appropriate candidates from those candidates. The channel calculation unit 202 stores channel information on the calculated path channel candidates in the path channel table 800 of FIG. 12.

In Step 404, the channel calculation unit 202 selects one of the path channel candidates, and calculates the links, the nodes, and the packages through which the active and the backup paths of the selected path channel candidate pass. If the active and the backup paths pass through the links, the nodes, and the packages, the channel calculation unit 202 writes flags in the channel link table 600, the channel node table 610, the channel package table 620, and the inter-channel-package table 630. If the active and the backup paths pass through the two packages stored in the inter-package management table 730, the channel calculation unit 202 writes the flag of a corresponding inter-package identifier in the inter-channel-package table 630.

In Step 405, the channel calculation unit 202 refers to the channel link table 600, tallies the number of links through which both of the active path and the backup path pass as the number of joints, and records the number of joints in a column of the requirement (1) of the appropriate path channel candidate of the channel candidate table 400. For example, the channel calculation unit 202 tallies the number of links where flags of both of the active path and the backup path in the channel link table 600 are on. Similarly, the channel calculation unit 202 tallies the number of nodes and the number of packages as the number of joints in the channel node table 610 and the channel package table 620, and records the number of joints in columns of the requirements (2) and (3) of the appropriate channel candidate in the channel candidate table 400. In Step 406, the channel calculation unit 202 refers to the channel node table 610, tallies the number of nodes through which the active path and the backup path pass as the number of hops, and records the number of hops in a column of the requirement (4) of the appropriate path channel candidate in the channel candidate table 400. In Step 407, the channel calculation unit 202 refers to the inter-channel-package table 630, tallies the number of times by which the active path and the backup path straddle the packages as the number of path straddles, and records the number of path straddles in a column of the requirement (5) of the appropriate path channel candidate in the channel candidate table 400. In Step 408, the channel calculation unit 202 refers to the channel link table 600 and the link redundant bandwidth table 640, tallies a sum of the inverse numbers of the redundant bandwidths of all the links through which the active path and the backup path pass, and records the tallied sum in a column of the requirement (6) of the appropriate path channel candidate in the channel candidate table 400.

In Step 409, the channel calculation unit 202 determines whether there is another path channel candidate, or not, and if yes, the processing is advanced to Step 404, but if no, the processing is advanced to Step 410. For example, if all of the path channel candidates calculated in Step 403 are selected, the processing is advanced to Step 410. On the other hand, if none of the path channel candidates is selected, the processing is returned to Step 404, and another path channel candidate is selected.

In Step 410, the cost calculation unit 205 refers to the channel candidate table 400, and acquires numerical values of the respective requirements of the respective path channel candidates. The cost calculation unit 205 also refers to the cost calculation coefficient table 500, acquires the cost calculation coefficients of the respective requirements, and records values obtained by adding numerical values resulting from multiplying the numerical values of the respective requirements by the cost calculation coefficients to all the requirements in the column "costs" in the channel candidate table 400 as the costs of the path channel candidates. In Step 411, the GUI controller 201 refers to the channel candidate table 400, and displays a path channel candidate list 900 in a screen of the management terminal 120. The node setting unit 203 may enter identification information on the candidates of the path channel selected by the operator according to the displayed list, and set the path in the node on the path channel.

FIG. 9 illustrates the path channel candidate list 900. In the path channel candidate list 900, the path channel candidates are displayed in ascending order of the costs, and the types of the requirements, the cost calculation coefficients, the numbers of occurrences of the respective path channel candidates, and the costs are displayed. When the number of occurrences, and the costs are given system specified values or more, highlight display can be conducted on the list. A given number of the path channel candidates may be displayed in the ascending order of the costs.

When the operator selects one of the path channel candidates in the path channel candidate list 900 by using the GUI of the management terminal 120, the GUI controller 201 can acquire information on the selected path channel candidate from the node management table 700, the link management table 710, the package management table 720, the inter-package management table 730, the channel link table 600, the channel node table 610, the channel package table 620, the inter-channel-package table 630, and the link redundant bandwidth table 640, and display a path channel candidate network diagram. An appropriate technique can be used in a technique for displaying the network diagram.

Figure 10:
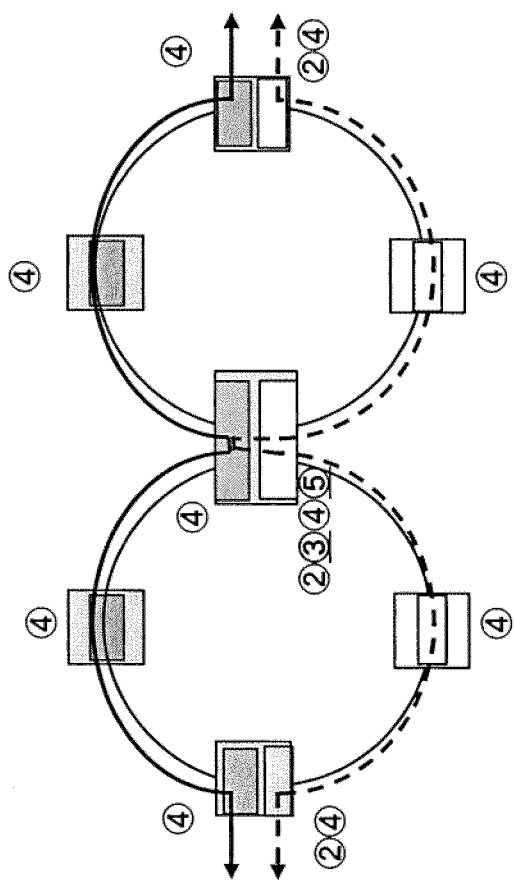
FIG. 10 is a diagram illustrating a display example of a path channel candidate network diagram.

FIG. 10 illustrates a display example of the path channel candidate network diagram.

In the path channel candidate network diagram, for example, the active path is indicated by a solid line, and the backup path is indicated by a broken line. Also, the redundant bandwidths of the links are also indicated on a table. Also, in portions where the phenomena that violate the respective requirements occur, numbers of those requirements are indicated. Further, in the specified requirements designated as the specified values of the system, Nos. of those requirements ((3) and (5) in this case) are highlighted.

(Adjustment of Cost Calculation Coefficients)

In the path channel candidate list 900 of FIG. 9, a ranking of the path channel candidates may be improper. For example, in the path channel candidate list 900 of FIG. 13, the requirement (4) of a path channel candidate 1 is 5, which is higher in ranking than a path channel candidate 2. However, as the number of hops in the requirement (4) is larger, a communication delay within the path channel becomes larger, which may be improper as the path channel. On the other hand, in the path channel candidate 2, the requirement (4) is 1, and the number of hops is smaller than the path channel candidate 1. Also, the requirement (3) of the path channel candidate 2 is 2, but when there are no other path channel candidates small in the number of hops, even if the number of package disjoints in the requirement (3) is large, the operator may determine that the path channel candidate 2 is a more proper path channel. Thus, when the ranking of the path channel candidates is improper, the cost calculation coefficients can be readjusted to correct the ranking of the path channel candidates. In order to correct the ranking of the path channel candidates, there is a method of readjusting the cost calculation coefficients described below.

Figure 11:
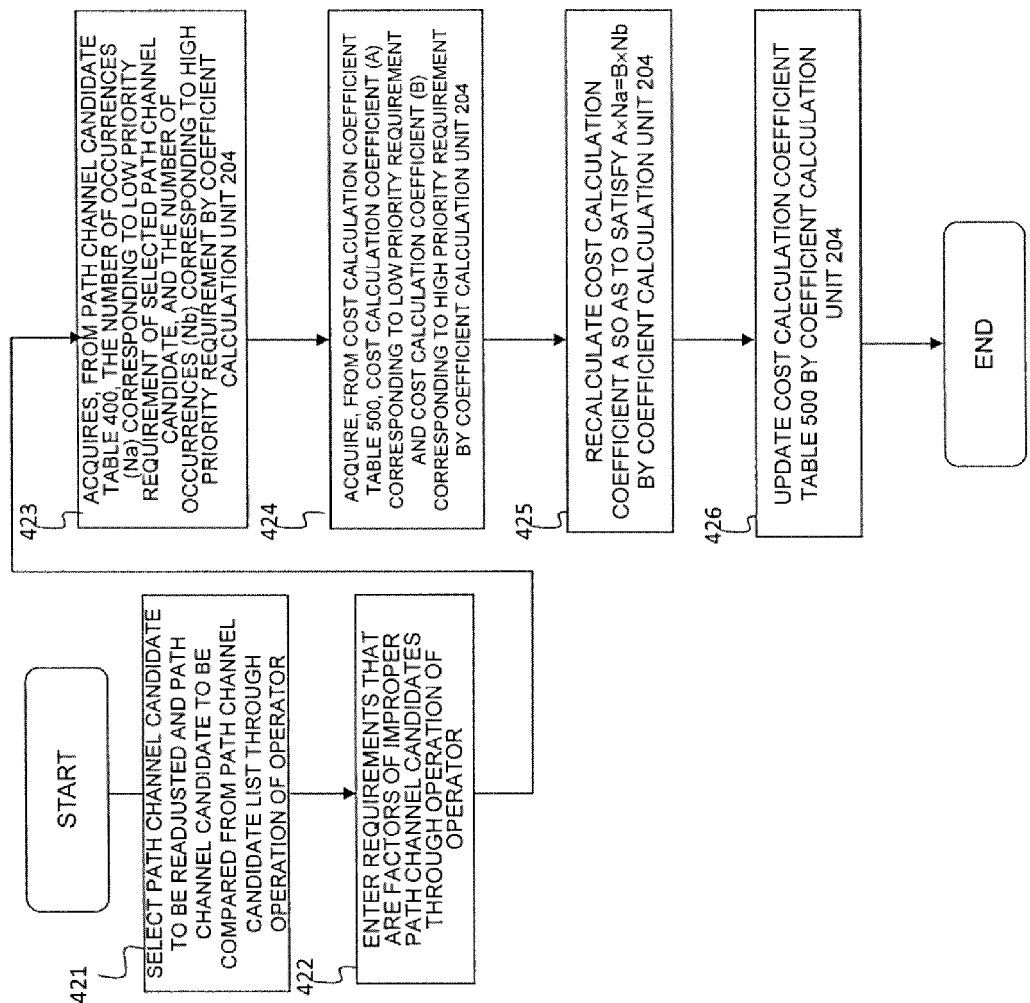
FIG. 11 is a flowchart illustrating recalculation of cost calculation coefficients.

FIG. 11 illustrates a flowchart when the cost calculation coefficient is readjusted.

In Step 421, the path channel candidate (path channel candidate to be readjusted) improper in the ranking, and the path channel candidate (path channel candidate to be compared) to be compared are selected from the path channel candidates indicated in the path channel candidate list 900 by using the GUI of the management terminal 120 by the operator. Then, the transport control server 100 enters identifiers of the path channel candidate to be readjusted and the path channel candidate to be compared.

In Step 422, the transport control server 100 enters two requirements that are factors of the improper path channel candidates which are set by using the GUI of the management terminal 120 by the operator. In this situation, in the two requirements, a requirement higher in priority is a high priority requirement, and a requirement lower in priority is a low priority requirement.

In Step 423, the coefficient calculation unit 204 acquires, from the path channel candidate table 400, the number of occurrences (Na) corresponding to the low priority requirement of the path channel candidates to be readjusted and the number of occurrences (Nb) corresponding to the high priority requirement of the path channel candidates to be compared.

In Step 424, the coefficient calculation unit 204 acquires, from the cost calculation coefficient table 500, a cost calculation coefficient (A) corresponding to the low priority requirement and a cost calculation coefficient (B) corresponding to the high priority requirement. In an example illustrated in FIG. 13, the path channel candidate to be readjusted is a path channel 1, and the path channel candidate to be compared is a path channel 2. In this example, A=1, B=5, Na=5, and Nb=2.

In Step 425, the coefficient calculation unit 204 recalculates the cost calculation coefficient A so as to satisfy A×Na=B×Nb. In Step 426, the coefficient calculation unit 204 updates the cost calculation coefficient corresponding to the low priority requirement in the cost calculation coefficient table 500 to a recalculated value, recalculates the costs for each of the path channels on the basis of the updated values, and also redisplays the path channel candidate list 900. The coefficient calculation unit 204 may change the cost calculation coefficient B of the high priority requirement other than to change the cost calculation coefficient A of the low priority requirement.

Another method of correcting the ranking of the path channel candidates will be described below. In the above-mentioned Step 423, the coefficient calculation unit 204 acquires, from the path channel candidate table 400, for example, the number of occurrences (Na) corresponding to the low priority requirement of the path channel candidate to be readjusted, and a cost value (Cb) of the path channel candidate to be compared. The coefficient calculation unit 204 may further acquire the number of occurrences (Nb) corresponding to the high priority requirement of the path channel candidate to be compared, and a cost value (Ca) of the path channel candidate to be readjusted.

In Step 424, the coefficient calculation unit 204 acquires the cost calculation coefficient (A) corresponding to the low priority requirement from the cost calculation coefficient table 500. The coefficient calculation unit 204 may further acquire the cost calculation coefficient (B) corresponding to the high priority requirement. In an example of FIG. 13, Ca=40 and Cb=41 are satisfied.

In Step 425, the coefficient calculation unit 204 changes the cost calculation coefficient A, and recalculates the cost calculation coefficient A so that a cost (Ca'=Na×A') of the path channel candidate to be readjusted and the cost (Cb) of the path channel candidate to be compared become identical with each other (Ca'=Cb) by a changed cost calculation coefficient A'. The other steps are identical with the respective steps in FIG. 11. FIG. 14 illustrates an example of a list of the recalculated cost calculation coefficients and the recalculated costs.

(Configuration Example of Transport Control System)

In the transport control system according to this embodiment, for example, in a communication network, in response to a request for path setting, the candidates of the path channels of the paired active paths and backup paths are calculated, and the number of occurrences of the phenomena that violate the respective requirements is calculated for each of the candidates of the path channels. Then, the costs of the path channels are calculated according to the number of occurrences and the cost calculation coefficient, the candidates of the path channels and the number of occurrences are listed in the ascending order of the costs, and the paths are set in the above nodes.

In calculation of the costs of the path channel, the costs of the path channels are calculated according to the number of occurrences, the inverse number of the redundant bandwidth, and the cost calculation coefficient. In the list, the number of occurrences of a value larger than a specified value may be highlighted. Also, in the list, when the operator selects the candidate of the path channels, the network diagram of the selected path is displayed, and in the portion where the phenomena that violate the respective requirements occur, Nos. of those requirements may be display, and specified requirements may be highlighted in the requirements.

In the above list, the operator selects the path channel candidates and the high priority requirement and the low priority requirement from the above requirements, to thereby recalculate the cost calculation coefficient, and redisplay the list. In recalculation of the cost calculation coefficient, the specified priority requirements are set so that a product of the high priority requirement and the cost calculation coefficient is identical with a product of the low priority requirement and the cost calculation coefficient.

INDUSTRIAL APPLICABILITY

The present invention can be applied to, for example, a network system in which candidates of path channels are automatically calculated.

DESCRIPTION OF REFERENCE NUMERALS AND SIGNS

100: transport control server
111 to 118: nodes
120: management terminal

201: GUI controller
202: channel calculation unit
203: node setting unit
204: coefficient calculation unit
205: cost calculation unit
206: data storage unit
207: topology and channel storage unit
208: path channel candidate storage unit
209: cost calculation coefficient storage unit
210: communication IF
700: node management table
710: link management table
720: package management table
730: inter-package management table
600: channel link table
610: channel node table
620: channel package table
630: inter-channel-package table
640: link redundant bandwidth table

The invention claimed is:

1. A transport control server coupled to a plurality of nodes in a network, the transport control server comprising:
  at least one processor coupled to a storage device, the at least one processor configured to:
    receive designation of a plurality of requirements for operation;
    select a group of candidates of path channels to be determined for the plurality of requirements, among paths that are among the plurality of nodes in the network and that are obtained by path search responsive to a request for path setting;
    determine a number of phenomenon according to any of the requirements or a value of network elements regarding any of the requirements, for each of the plurality of candidates of path channels of the selected group, for each of the designated requirements, wherein the phenomenon comprises at least one of a link disjoint, a node disjoint, or a package disjoint, and wherein the value of network elements comprises at least one of a number of hops, a number of package straddles, or redundant bandwidths;
    provide the determined number of phenomenon or the determined value of network elements for each of the requirements in distinguishable state;
    receive designation of a coefficient which is given for each of the requirements;
    determine cost for each of the plurality of candidates of path channels of the group based on (i) the coefficient and (ii) the number of phenomenon or the value of network elements determined for each of the requirements;
    determine a rank of the plurality of candidates of path channels of the group using the determined cost;
    receive a correction of the coefficient after determining the rank of the plurality of candidates of path channels of the group using the designated coefficient;
    re-determine the cost by using the corrected coefficient where the corrected coefficient is designated; and
    pair a candidate of an active path with a candidate of a backup path, both are selected among the paths obtained by the path search, when selecting the group of candidates of path channels.

2. The transport control server according to claim 1, wherein the at least one processor is further configured to provide an order of the plurality of candidates of path channels of the group in distinguishable state for each requirement, based on the determined number of phenomenon or the determined value of network elements.

3. The transport control server according to claim 2, wherein the at least one processor is further configured to provide the rank of the plurality of candidates of path channels of the group.

4. The transport control server according to claim 1, wherein the at least one processor is further configured to display the determined number of phenomenon or the determined value of network elements, for each of the plurality of candidates of path channels of the group, for each of the requirements.

5. The transport control server according to claim 3, wherein the at least one processor is further configured to display the determined number of phenomenon or the determined value of network elements, and the cost, by corresponding each other, for each of the plurality of candidates of path channels of the group, for each of the requirements.

* * * * *